UNITED STATES PATENT OFFICE.

CAIUS T. RYLAND, OF SONOMA, CALIFORNIA.

AUTOMATIC BALANCING AND STEERING DEVICE.

1,150,542.  Specification of Letters Patent.  Patented Aug. 17, 1915.

Application filed April 27, 1914. Serial No. 834,601.

*To all whom it may concern:*

Be it known that I, CAIUS T. RYLAND, a citizen of the United States, residing at Sonoma, in the county of Sonoma and State of California, have invented new and useful Improvements in Automatic Balancing and Steering Devices, of which the following is a specification.

This invention relates to an automatic balancing and steering device.

It is one of the objects of the present invention to provide a balancing and steering device for motor bicycles, and like vehicles, which is simple and compact in construction and automatic in operation.

Another object of the invention is to provide means for counterbalancing persons or loads of varying weights.

Further objects will hereinafter appear.

The invention consists of the parts and the construction and combination of parts as hereinafter more fully described and claimed, having reference to the accompanying drawings, in which—

Figure 1:
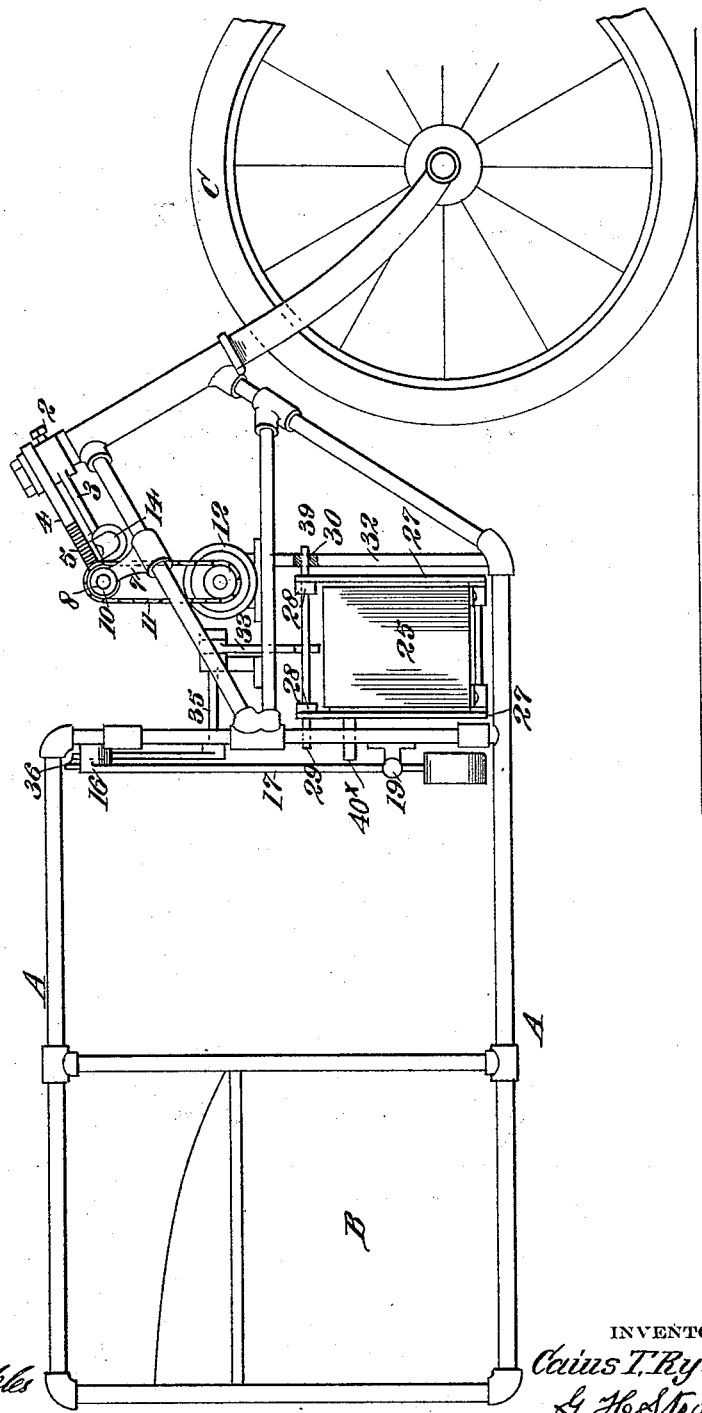
Figure 2:
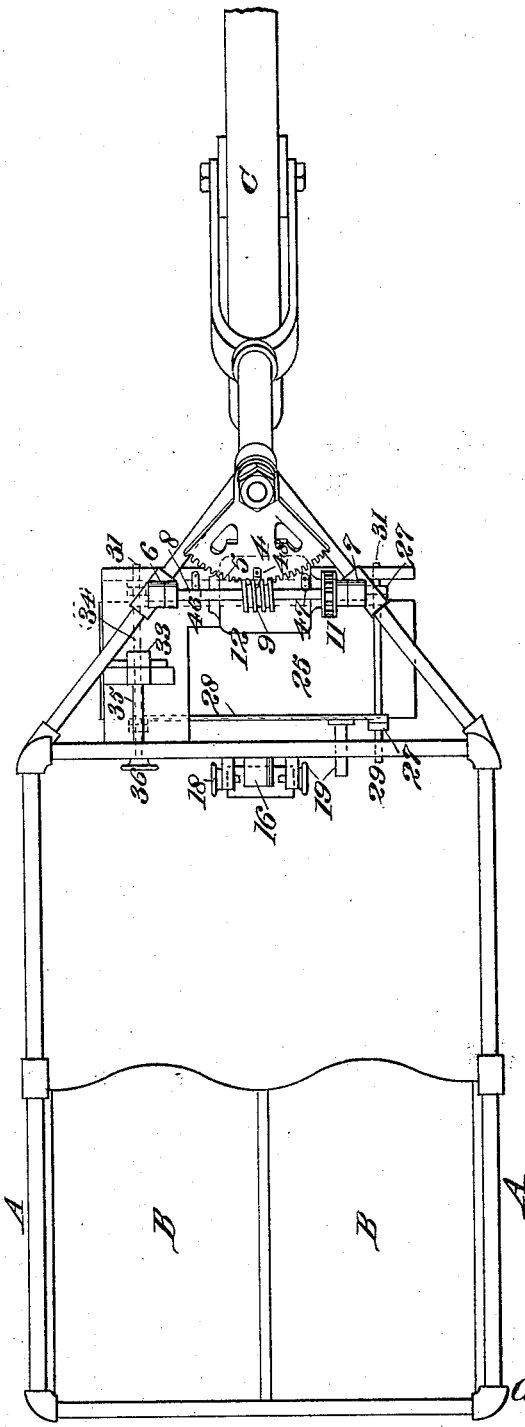
Figure 3:
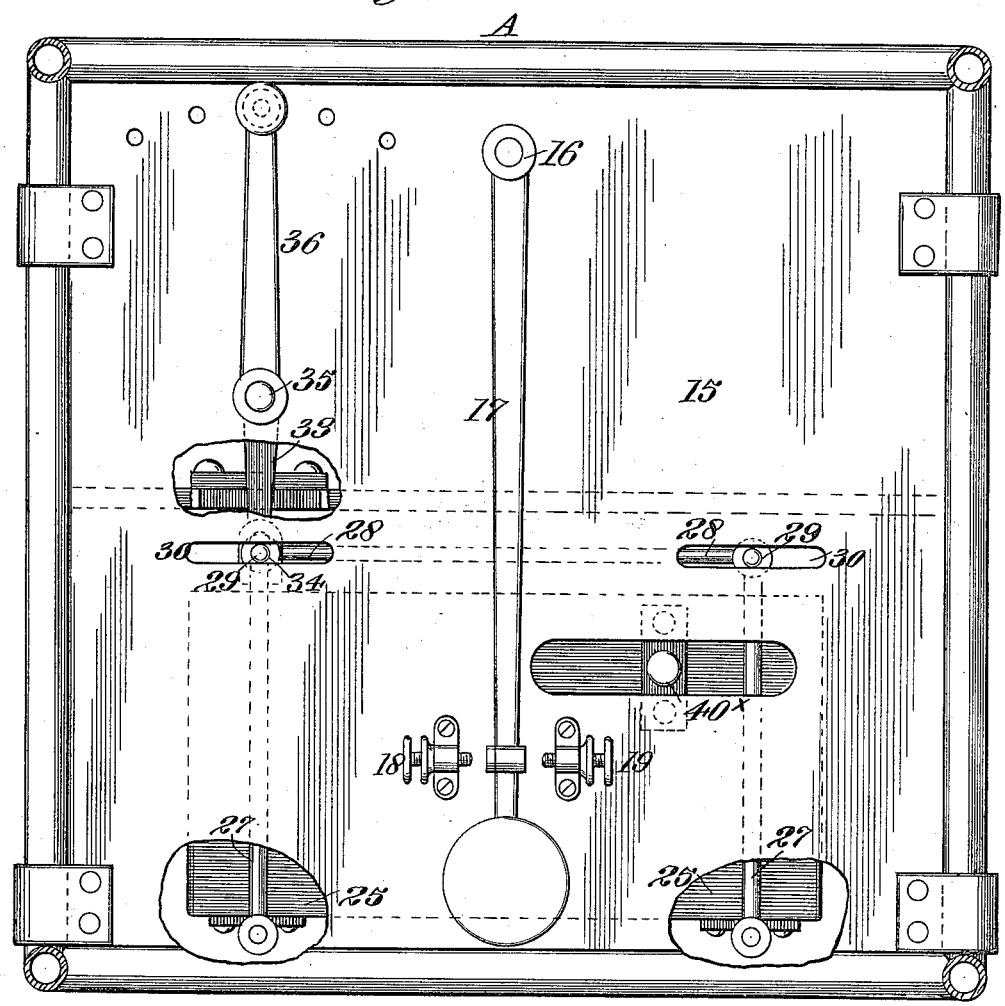
Figure 4:
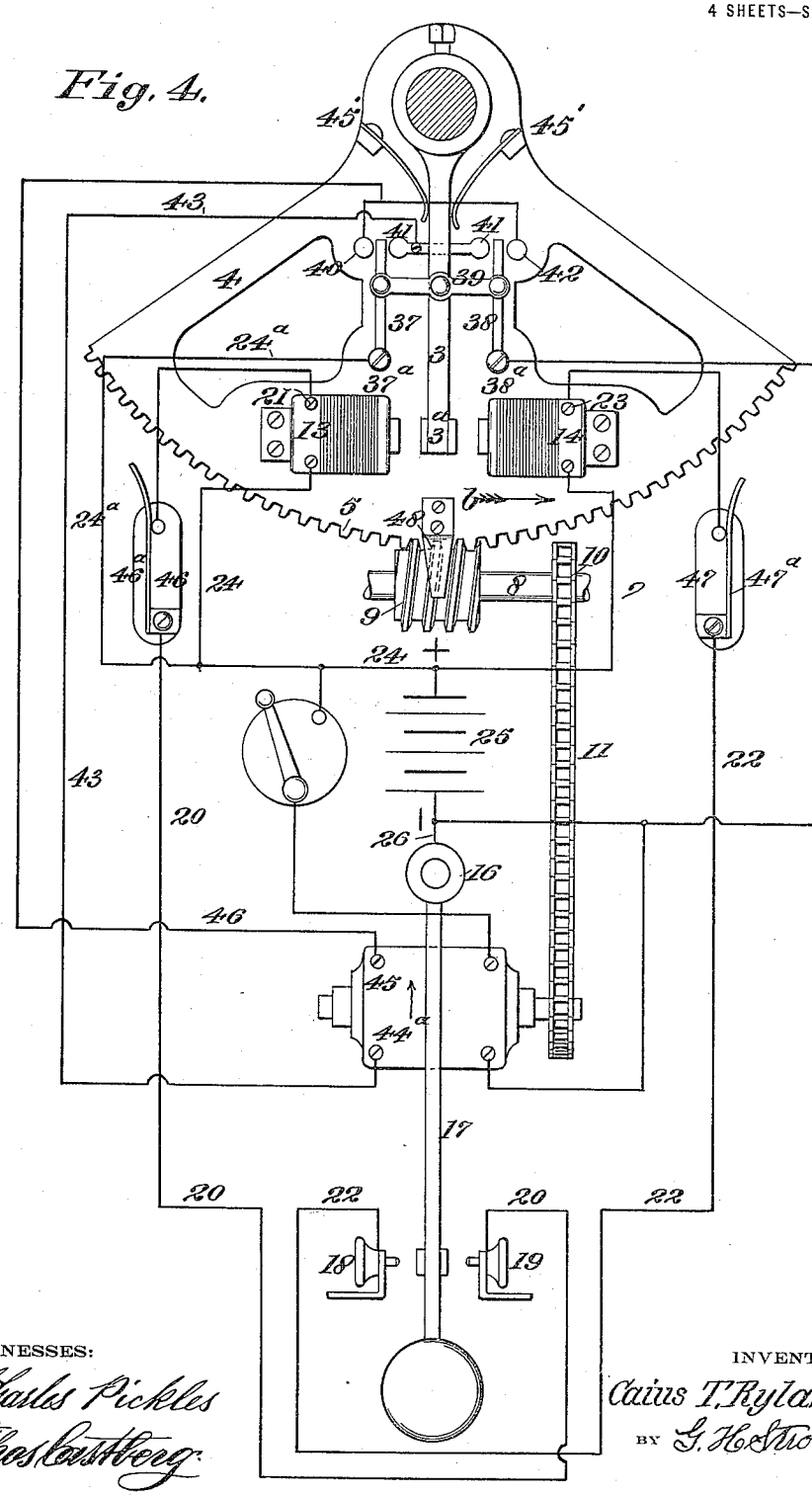

Figure 1 is a side elevation of the vehicle showing the application of the invention. Fig. 2 is a plan view of same. Fig. 3 is a rear elevation of the dashboard. Fig. 4 is a diagrammatic view of the electrical connections.

Referring to the drawings, A indicates the frame of a two wheeled motor-driven vehicle, which in this instance is provided with a double seat B. The rear portion of the frame, together with the drive wheel and engine, is not shown as it forms no part of the present invention.

Suitably secured to the steering post of the front wheel, as at 2, is an arm 3, and turnably mounted on the steering post is a segmental-shaped arm 4, upon the outer periphery of which are formed gear teeth 5. Suitably journaled within the frame, as at 6 and 7, is a horizontally positioned shaft 8, and secured on said shaft and intermeshing with the teeth on the segment is a worm gear 9. The worm gear, with connected shaft, is in this instance connected through a sprocket 10 and chain 11 with an electrically driven motor 12. Any other suitable transmission may, however, be utilized for this purpose.

Secured to the segment 4, on each side of arm 3, is a pair of magnets 13 and 14. Fixed on the outer end of arm 3 is a double-acting armature plate 3ª, which, with the connected arm, is adapted to be energized and attracted by either set of magnets. 15 indicates a dashboard upon which is pivotally mounted, as at 16, a pendulum 17. Mounted on the dashboard 15 in juxtaposition to the sides of said pendulum and near its lower end is a pair of contact members 18 and 19. The contact member 19 is in this instance connected through a wire 20 with a terminal 21 of magnet 13, while contact 18 is connected through a wire 22 with a terminal 23 of magnet 14. The opposite terminal of each set of magnets is in turn connected through a wire 24 with a battery 25 and the other terminal of said battery is connected through a wire 26 with the pendulum 17. The battery 25 is in this instance pivotally supported by arms 27 from a movable frame 28, said frame being supported on one side by extensions 29 which project through slots 30 formed in the dashboard, while the opposite side of the frame is supported by extensions 31 which project through similar slots in a sub-frame 32.

The frame 28 is adapted to be shifted from one side of the center to the other, as the case may be, through means of a fork-shaped crank arm 33 which engages with a cross-bar 34 on the frame. The crank arm 33 is secured to a horizontally disposed shaft 35, on the outer end of which is mounted a lever 36.

The seat B, as previously stated, is sufficiently wide to accommodate two persons. The peculiar method of supporting the battery box is provided for the purpose of counterbalancing any difference in weight between the persons occupying the seat. For instance, if a person on the left side of the seat weighs thirty pounds more than the other occupant, it is possible to counterbalance this difference in weight by rocking lever 36. This will move the frame 28, with suspended battery box 25, a sufficient distance to counterbalance the variation in weight.

The automatic steering of the vehicle is accomplished in the following manner: If, when traveling along a straight road, it is desired to turn to the left, it is only necessary to lean the body to the left side. This will immediately throw the vehicle out of equilibrium, or, in other words, cause the vehicle to lean slightly to one side. The pendulum 17 having a tendency to remain vertical will thus close a circuit through contact 18 and magnet 14, energizing this and attracting armature 3ᵃ with connected lever 3. A slight movement of arm 3 is thus transmitted through the steering post and forks to the front wheel C, causing this to turn slightly to the left.

Secured to the segment, as at 37 and 38, are the blades of a reversing switch, and connecting said blades with arm 3 is a crossbar 39.

40, 41 and 42 indicate the opposite terminals of the reversing switch with which the blades 37 and 38 are adapted to be thrown into engagement.

The energization of magnet 14 will attract armature plate 3ᵃ, with connected arm 3, causing the steering post, with connected wheel, to be slightly turned. Movement is at the same time transmitted through the cross-bar 39 to move the blades of the reversing switch into engagement with the contacts 41 and 42. This closes a circuit through motor 12 which can be traced as follows: Current passes from the positive side of the battery 25 through the wires 24 and 24ᵃ to enter terminal 37ᵃ of the reversing switch. It then passes through the blade 37 and contact 41 and out through a wire 43, which connects with a terminal 44 of the motor, and then passes through the motor in the direction of the arrow out through a terminal 45, wire 46 to enter terminal 42 of the reversing switch and passes through blade 38, terminal 38ᵃ and wire 44ᵃ back to the battery. A circuit is thus completed through the motor which will drive it in the direction of the arrow, and the power thus produced is transmitted through the chain 11 and sprocket 10 to the worm wheel 9, which in turn will move the segment in the direction of arrow b.

Any desired turn may be made by leaning to one side or the other and it is only necessary to assume a straight position when it is desired to regain a straight course. When it is desired to turn the segment, with arm 3 and steering post, in the direction opposite to arrow b, it is acccomplished by leaning to the right side. This causes the pendulum lever 17 to close a circuit through the contact 19 and magnet 13 and similarly causes the arm 3 to move the blades of the reversing switch into engagement with the contacts 40 and 41. A circuit is thus closed through the motor 12 which will cause it to revolve in a direction opposite to that indicated by arrow a. The driving connection between the motor and segment is thus reversed and the segment will consequently travel in a direction opposite to that indicated by arrow b.

Arm 3, when released by either magnet 13 or 14, is normally held in a central position between the magnets by spring members 45′, and means are provided for limiting the turning movement of the segment or arm 3 to prevent any excessive turning movement of the steering post and wheel. This is accomplished by automatically opening the pendulum circuit through the magnet 13 or 14.

Referring to Fig. 4, 46 and 47 indicate a pair of switches through which the circuit is normally closed by spring arms 46ᵃ and 47ᵃ. These switches are placed directly in the separate magnet circuits and are actuated in the following manner: 48 indicates a pin or projection secured to the segment. The turning movement of the segment in the direction of arrow b will, when moved to the limiting point, bring the projection 48 into engagement with the spring arm 47ᵃ and force this outwardly a sufficient distance to open a circuit between the contact 18 and magnet 14. The pendulum circuit through the magnet is thus automatically broken and arm 3 is permitted to assume its normal position intermediate of the magnets. This causes the reversing switch to assume its normal intermediate position, indicated in Fig. 4, consequently breaking the circuit through the motor 12. The driving connection between the motor and segment is thus stopped and the movement of the segment limited. The movement of the segment in a direction opposite to arrow b is similarly limited by the engagement of projection 48 with the spring arm 46ᵃ. This opens the circuit through contact 19 and magnet 13, etc., causing the reversing switch to open the motor circuit and limit the movement of the segment in this direction.

For the purpose of making it possible to produce a quick turn to avoid accidents under certain circumstances, it is desirable to quickly move the battery box to one side or the other. This is accomplished by providing an extension 40ˣ on the box which projects through a slot in the dashboard. This may be engaged by the foot and moved to one side or the other as the case may be. The battery box being hung by the arms 27 from the frame can thus be swung from one side to the other within the frame without disturbing the adjustment of the lever 36. The center of gravity is thus quickly shifted to safely make the turn desired and equilibrium may again be restored by simply releasing extension 40ˣ.

An automatic steering device constructed as here shown may be applied to any suitable form of motorcycle, two-wheeled vehicle, or to the steering runner of a two-runner sled, or the rudders in boat or like devices driven by an air propeller. Being positively automatic in operation it gives the rider greater freedom and avoids accidents which might otherwise take place.

The materials and finish of the several parts of the device are such as the experience and judgment of the manufacturer may dictate.

I wish it understood that various changes in form, proportions and minor details of construction may be resorted to within the scope of the appended claims and that I do not with to limit myself to the specific design and construction here shown.

Having thus described my invention, what I claim and desire to secure by Letters Patent is—

1. In combination with the steering post of a vehicle, an arm rigidly connected to the post, a double acting armature plate on the free end portion of the arm, a magnet on each side of the arm and normally spaced therefrom for engagement with said plate, springs engaged with the arm to normally hold same in a central position between the magnets, a segmental-shaped arm turnably mounted on said post and having peripheral gear teeth and carrying said magnets, a pendulum, a pair of spaced contacts between which the pendulum operates, an electric motor, a normally open electrical circuit which includes said motor, contacts and magnets, a worm gear meshed with the teeth of the segment, and means to drive the worm gear from the motor.

2. In combination with the steering post of a vehicle, an arm rigidly connected to the post an armature on the arm, a member loosely mounted on the post, a pair of magnets carried by said member and arranged in spaced relation to and on opposite sides of the armature, an electric motor, a pendulum, a pair of spaced contacts disposed on opposite sides of the pendulum, a normally open electrical circuit including the motor, magnets and contacts, and means to drive the member from the motor.

3. In combination with the steering post of a vehicle, an arm rigidly connected to the post, a member loose on said post, means to drive said member, means to lock said member to the arm, and means controlled by tilting of the vehicle for causing locking and unlocking of said locking means and for operating said driving means.

4. In combination with the steering post of a vehicle, an arm rigidly connected to the post an armature on the arm, a member loosely mounted on the post, a pair of magnets carried by said member and arranged in spaced relation to and on opposite sides of the armature, an electric motor, a pendulum, a pair of spaced contacts disposed on opposite sides of the pendulum, a normally open electrical circuit including the motor, magnets and contacts, means to drive the member from the motor, and means whereby when the member has traveled a predetermined distance in either direction the circuit will be opened to stop the motor.

5. In combination with the steering post of a vehicle, a loose and a rigid member on the post, means to lock said members to one another, means to drive the members when locked, and means whereby upon tilting of the vehicle said locking and driving means will be actuated.

6. In combination with the steering post of a vehicle, and means to actuate same, means to drive said actuating means and means to control the driving means including a single pendulum which when the vehicle is tilted in one direction effects drive of said driving means in that direction and which when the vehicle is tilted in the opposite direction effects drive of said driving means in said opposite direction.

In testimony whereof I have hereunto set my hand in the presence of two subscribing witnesses.

CAIUS T. RYLAND.

Witnesses:
JOHN H. HERRING,
W. W. HEALEY.

Copies of this patent may be obtained for five cents each, by addressing the "Commissioner of Patents, Washington, D. C."